Patented Mar. 21, 1950

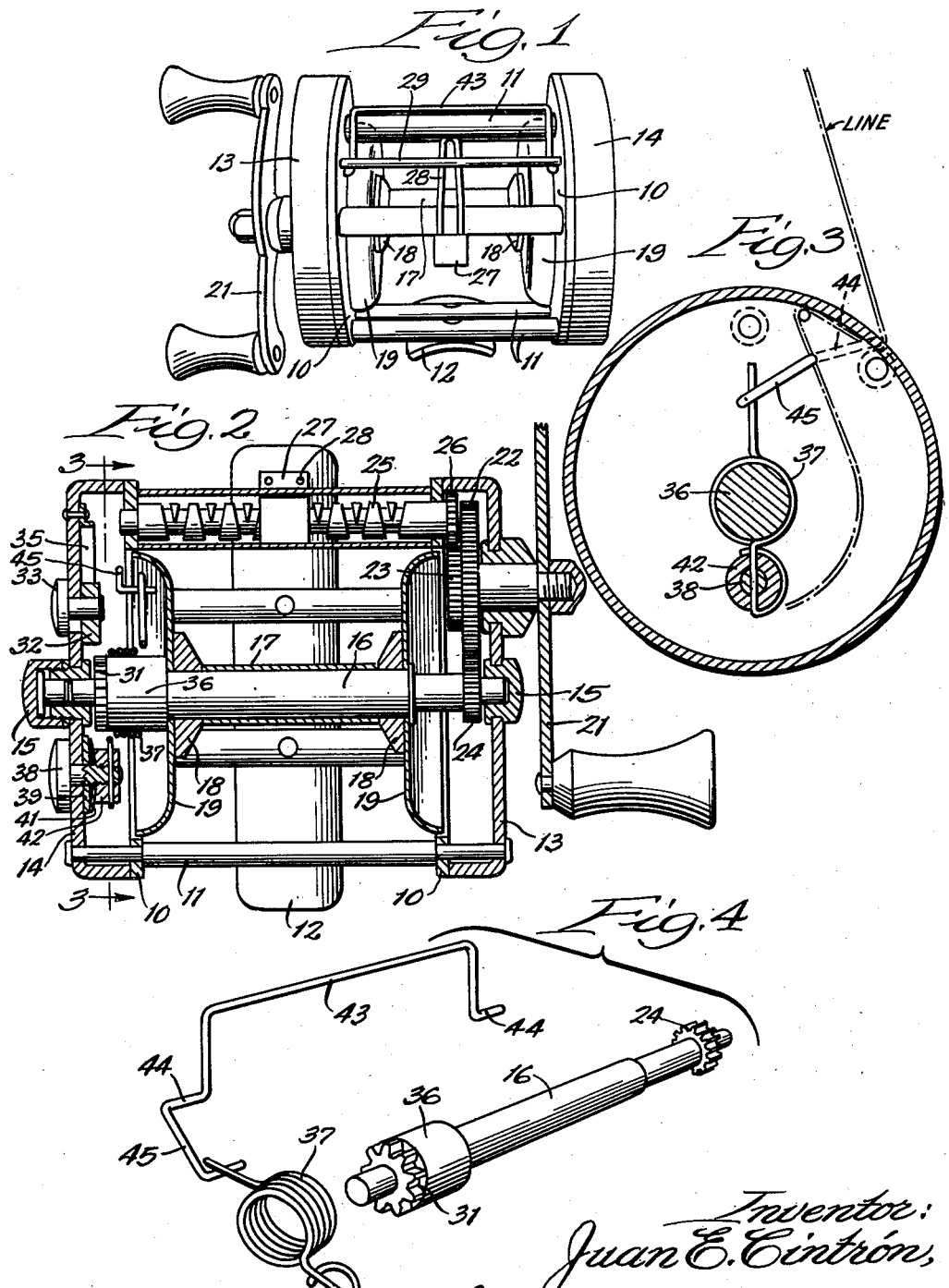

2,501,378

UNITED STATES PATENT OFFICE 2,501,378

FISHING REEL

Juan E. Cintrón, South Bend, Ind., assignor to John L. Schohl, South Bend, Ind.

Application April 9, 1947, Serial No. 740,399

4 Claims. (Cl. 242—84.5)

This invention relates to fishing reels and more particularly to casting reels provided with an anti-backlash brake mechanism.

One of the objects of the invention is to provide a fishing reel in which the spool is accurately braked as required to prevent overrunning of the spool during casting.

Another object is to provide a reel in which the maximum available degree of braking can be adjusted or in which the brake can be made inoperative.

Still another object is to provide a reel in which the spool is braked by a coiled strip or spring to provide braking in one direction and free spool movement in the other direction.

The above and other objects and advantages of the invention will be more readily apparent from the following description when read in connection with the accompanying drawing in which—

Figure 1 is a front elevation of a reel embodying the invention;

Figure 2 is an enlarged horizontal section through the reel;

Figure 3 is a transverse section on the line 3—3 of Figure 2; and

Figure 4 is a disassembled perspective view of the reel shaft, brake and bail.

The reel as shown is of the usual bait casting type and may be made of any size to suit the requirements for which it is intended. The reel comprises a frame formed by a pair of end rings 10 rigidly connected by cross bars 11. The usual reel seat 12 may be carried by adjacent cross bars to mount the reel on a rod.

Cupped covers 13 and 14 are rigidly secured over the end rings 10, as by extensions on the cross bars 11, and form end housings for spool controlling mechanism. Each of the covers carries a central bearing cap 15 in which the ends of a spool shaft 16 are journaled. As shown one of the bearing caps may be made adjustable to adjust the end play of the spool and, if desired, to produce a light drag on the spool. The shaft 16 carries a spool formed by a central tube 17 abutting at its ends against fillet rings 18 which in turn seat against cupped flanges 19. The spool parts may be held rigidly on the shaft 16 in a position such that the flanges 19 fit within the end rings 10 with relatively small clearance.

The spool may be driven to wind a line thereon by a hand crank 21 mounted eccentrically in the cover 13 and carrying a compound gear 22—23 inside the cover. The gear 22 meshes with a relatively small pinion 24 on the spool shaft so that the spool will be rotated rapidly as the crank is turned.

The gear 23 drives a level wind mechanism which includes a cross threaded shaft 25 journaled in the end rings 10 and carrying a small pinion 26 meshing with the gear 23. A carriage 27 rides on the shaft 25 and carries a looped wire 28 through which the line may extend. The carriage is held against turning on the shaft by fitting the upper end of the looped wire 28 slidably into a slot in the cross bar 11 next above the shaft 25. The line may be guided by the sides of the looped wire 28 at the sides and top and by a cross guide rod 29 extending across the frame below the top of the loop.

The usual click drag may be provided for the spool and for this purpose one end of the shaft 16 carries a pinion 31 which is adapted to be engaged by a pivoted tooth 32. The tooth 32 may be moved radially into or out of engagement with the pinion 31 through a control button 33 connected to the tooth through a radial slot in the cover 14. An arcuate leaf spring 35 connected to the cover 14 engages the tooth 32 and tends to hold it radial so that the click drag is effective in both directions.

In order to brake the spool to prevent it from overrunning the line during casting, the shaft 16 is formed between the pinion 31 and the adjacent end flange 19 with an enlarged cylindrical hub 36. An elongated strip of spring wire or the like 37 is wound around the hub 36 with its ends projecting from the hub. Preferably the wire is initially so coiled that it will grip the hub and it may be of any desired strength and with any desired number of turns to produce the required braking force.

One end of the wire is held by an adjustable anchor formed by a screw 38 extending through a circumferential slot in the cover 14. The screw 38 carries a friction washer 39 pressed against the inside of the cover by a dished spring 41. The spring is held by a nut 42 threaded on the screw 38 and the end of the wire may extend through registering openings in the nut and the screw and be bent around the nut as shown. The washer 39 provides sufficient friction to hold the anchor in any position to which it is moved to adjust the braking effect or to make the brake ineffective as explained hereinafter.

The other end of the wire is moved by means responsive to changes in tension in a line being withdrawn from the spool automatically to control the brake. As shown, this means comprises a bail wire 43 extending across the spool and having its ends bent to form offset pivot portions 44 which are journaled in the end rings 10. One end of the bail wire is formed with an extension 45 which engages the other end of the spring strip 37.

In use the line is threaded through the loop 28 and over the bail wire 43. Tension on the line will rock the bail wire down to turn the upper end of the spring strip 37 clockwise as seen in Figure 3 to unwind the spring strip. As the line tension decreases the spring strip will coil into engagement with the hub 36. During casting the hub is turning in a direction such that friction on the strip 37 tends to wind it tighter upon the hub so that the spool will be braked to an extent depending upon the position of the bail wire. During rewinding friction on the strip tends to unwind it so that the line can be retrieved with minimum drag.

The maximum available braking can be adjusted by moving the adjustable anchor screw 38. When this screw is moved clockwise as seen in Figure 3, the strip 37 tends to wind tighter on the hub 36 to increase the braking effect. If the anchor is moved to its extreme counterclockwise position, the strip 37 may be unwound to a point where it will not engage the hub regardless of the position of the bail wire.

While one embodiment of the invention has been shown and described in detail herein, it will be understood that this is illustrative only and is not to be taken as a definition of the scope of the invention, reference being had for this purpose to the appended claims.

What is claimed is:

1. A fishing reel comprising a frame, a spool rotatably carried by the frame to carry a line, a substantially cylindrical hub on the spool, a spring wound about the hub with its ends projecting therefrom, means movable on the frame to anchor one end of the spring in any one of a plurality of positions, and means responsive to variations in tension in the line as it is withdrawn from the spool to move the other end of the spring between a position in which the spring is unwound to loosen it on the hub and a second position in which it spring engages the hub.

2. A fishing reel comprising a frame, a spool rotatably carried by the frame to carry a line, a substantially cylindrical hub on the spool, a spring wound about the hub with its ends projecting therefrom, means movable on the frame to anchor one end of the spring in any one of a plurality of positions, and means responsive to variations in tension in the line to move the other end of the spring.

3. A fishing reel comprising a frame, a spool rotatably carried by the frame to carry a line, a substantially cylindrical hub on the spool, a spring wound about the hub with its ends projecting therefrom, means movable on the frame to hold one end of the spring in any one of a plurality of positions, a bail wire pivoted on the frame and extending across the spool to be engaged and moved by the line, and an extension on the bail wire engageable with the other end of the spring to move it in a direction to unwind the spring.

4. A fishing reel comprising a frame, a spool rotatably mounted on the frame having transverse flanges adjacent its ends, a cylindrical hub on the spool outside of one of the flanges, an elongated flexible strip wound around the hub with its ends projecting therefrom, means movable on the frame to hold one of the strip ends in any one of a plurality of positions, and a bail member pivoted on the frame to be engaged and moved by a line being withdrawn from the reel, the bail member engaging the other end of the strip to move it.

JUAN E. CINTRÓN.

REFERENCES CITED

The following references are of record in the file of this patent:

UNITED STATES PATENTS

| Number | Name | Date |
|---|---|---|
| 843,514 | Baumgartel | Feb. 5, 1907 |
| 2,057,178 | Balz | Oct. 13, 1936 |
| 2,083,927 | Sinex | June 15, 1937 |